(12) United States Patent
Miele et al.

(10) Patent No.: US 7,743,629 B2
(45) Date of Patent: Jun. 29, 2010

(54) PROCESS OF APPLYING ATOMIZED BINDER TO FIBEROUS PRODUCT USING A ROTARY MEMBER

(75) Inventors: Philip Francis Miele, Highlands Ranch, CO (US); Don August Forte, Evergreen, CO (US); Roy V. Pogue, Littleton, CO (US)

(73) Assignee: Johns Manville, Denver, CO (US)

( * ) Notice: Subject to any disclaimer, the term of this patent is extended or adjusted under 35 U.S.C. 154(b) by 262 days.

(21) Appl. No.: 10/274,691

(22) Filed: Oct. 21, 2002

(65) Prior Publication Data

US 2004/0074262 A1  Apr. 22, 2004

(51) Int. Cl.
*C03B 37/04* (2006.01)

(52) U.S. Cl. ............... 65/43; 65/529; 65/459; 239/223

(58) Field of Classification Search ........... 65/443, 65/450, 451, 521, 529; 239/223
See application file for complete search history.

(56) References Cited

U.S. PATENT DOCUMENTS

| | | | | |
|---|---|---|---|---|
| 2,931,422 A | * | 4/1960 | Long ..................... | 65/450 |
| 3,902,878 A | * | 9/1975 | Hoag et al. ............. | 65/447 |
| 4,105,424 A | * | 8/1978 | Levecque et al. ....... | 65/450 |
| 4,246,242 A | * | 1/1981 | Butler et al. ........... | 423/210 |
| 4,433,120 A | * | 2/1984 | Chiu ..................... | 525/501 |
| 4,433,992 A | * | 2/1984 | Debouzie et al. ....... | 65/443 |
| 4,516,996 A | * | 5/1985 | Willard et al. .......... | 65/450 |
| 4,832,723 A | * | 5/1989 | Shisler et al. .......... | 65/518 |
| 5,100,450 A | * | 3/1992 | Cunningham ........... | 65/447 |
| 5,123,949 A | * | 6/1992 | Thiessen ................ | 65/450 |
| 6,106,902 A | * | 8/2000 | Koskinen et al. ....... | 427/424 |

OTHER PUBLICATIONS

Proptec.com webpage from Jun. 2002—based on Web.archive.org's version of it on May 24, 2007.*

* cited by examiner

*Primary Examiner*—John Hoffmann
(74) *Attorney, Agent, or Firm*—Robert D. Touslee

(57) ABSTRACT

Provided is a process and apparatus for applying a liquid binder to fibers. The process involves introducing heat curable liquid binder onto moving fibers by atomizing the liquid binder and applying the atomized binder from a point within the moving column of fibers. Better binder efficiency and a more efficient overall process is realized.

14 Claims, 2 Drawing Sheets

PROCESS OF APPLYING ATOMIZED BINDER TO FIBEROUS PRODUCT USING A ROTARY MEMBER

BACKGROUND OF THE INVENTION

1. Field of the Invention

The subject invention pertains to the production of fibrous products using a binder. More particularly, the present invention relates to an improved method of applying liquid binder to the fibrous products.

2. Description of the Related Art

The rotary process for producing glass fibers is well established. A stream of molten glass is delivered to an open spinning disc containing multiple orifices that causes fibers to extrude from the disc sidewall. The extruded fibers are directed downwardly toward a moving chain by pressurized air from nozzles in an annular ring positioned above the disc or by the jet blast of a gaseous combustion system. As the fibers fall from the spinning disc a rotating column of glass fiber is formed, which is sprayed with binder that is later cured, after sizing, in an oven. Typically the binder is sprayed onto the fibers from a number of inwardly directed nozzles mounted circumferentially around the fiber column just below the disc.

The tendency of the small orifices in the spray nozzles to become clogged or plugged however, causes uneven binder distribution in the finished product. In addition, the spray nozzles and associated headers and piping collect and trap fibers laden with binder which can accumulate into clumps that eventually become dislodged and deposited in the fiber blanket causing uneven density and product color. Changes in binder viscosity or flow rate necessitate further changes in spray orifice size or increasing/reducing the number of spray nozzles to maintain a constant binder droplet size. Furthermore, it is difficult for an inwardly directed binder spray to uniformly penetrate the dense fiber column, thus leaving some fibers without binder. In attempting to provide continuous coverage of the fiber column the spray nozzles are often configured in an overlapping spray pattern that often results in binder collecting on the collection chamber walls. Non-uniform coating of the glass fibers with binder results in variable physical properties from one section of the product to another. Therefore, it is highly desirable to have an improved method of binder application.

U.S. Pat. No. 5,123,949 describes a process for introducing additive particles to extruded fibers during the production of the fibers. The additive particles are delivered from the inside of the column of fibers. Liquid binder can also be sprayed concurrently with the additive particles from the inside of the column. As discussed in the patent, some of the binder is intercepted by the additive particles. Additional liquid binder can be sprayed onto the fibers using nozzles external to the fiber column, if desired.

Still, better binder efficiency is desired and important to rendering the overall process more efficient. A process for applying binder more effectively and efficiently would greatly enhance the commercial viability of a fiberglass product such as insulation.

Accordingly, it is an object of the present invention to provide one with a more efficient process of applying binder to glass fibers.

It is another object of the present invention to provide a more efficient and effective process for applying binder to glass fibers prepared by a rotary process.

Another object of the present invention is to provide a novel process with improved binder efficiency which avoids the problems of plugging or clogging, and which is independent of the binder solution viscosity.

These and other objects of the present invention will become apparent to the skilled artisan upon a reading of the following specification and the Figures of the drawing, and the claims appended hereto.

SUMMARY OF THE INVENTION

In accordance with the foregoing objectives, there is provided a novel process for applying liquid binder to fiberglass. The process comprises first heating glass to a softening point in order to liquify same and then introducing the molten glass into a spinning rotor having a sidewall containing openings therein whereby the molten glass is extruded through the openings by centrifical force to form primary fiberglass fibers. These primary fibers are then attenuated to create a moving column of fibers. Heat curable liquid binder is then introduced to the moving fibers by atomizing the liquid binder and applying the atomized binder from a point within the column. In atomizing the liquid binder, it is preferred that the liquid binder is atomized such that the binder is present in the form of droplets having a size in the range of from 25 to 150 microns.

Among other factors, it has been discovered that by atomizing the liquid binder to small droplets of solution, a much improved binder efficiency is realized. In essence, all of the binder is captured by the fiberglass fibers. This overcomes the problems of spraying the binder from outside of the veil and avoids creating emissions or the loss of binder, which eventually ends up in process or wash water, or air exhaust streams. Furthermore, by atomizing, the process is independent of the binder solution viscosity. This would allow for a more viscous polymer solution, i.e., less water. The subsequent impact of this is that there would be less water in the ovens when the binder is cured, which would render the overall process more efficient and faster. In a preferred embodiment, a rotary atomizer is used, which avoids the possibility of any nozzles or holes getting plugged.

In another embodiment, there is provided an apparatus for applying a liquid binder to the inside of a veil of primary fibers. The apparatus comprises means for heating material capable of being fiberized to a softening point in order to liquify same. The apparatus further comprises means for extruding the liquid material through openings by centrifical force to form primary fibers, and means for atomizing the liquid binder and hurling the atomized liquid binder particles or droplets radially outward, with the atomizing means being located beneath the extruding means.

DETAILED DESCRIPTION OF THE PREFERRED EMBODIMENTS

Figure 1:
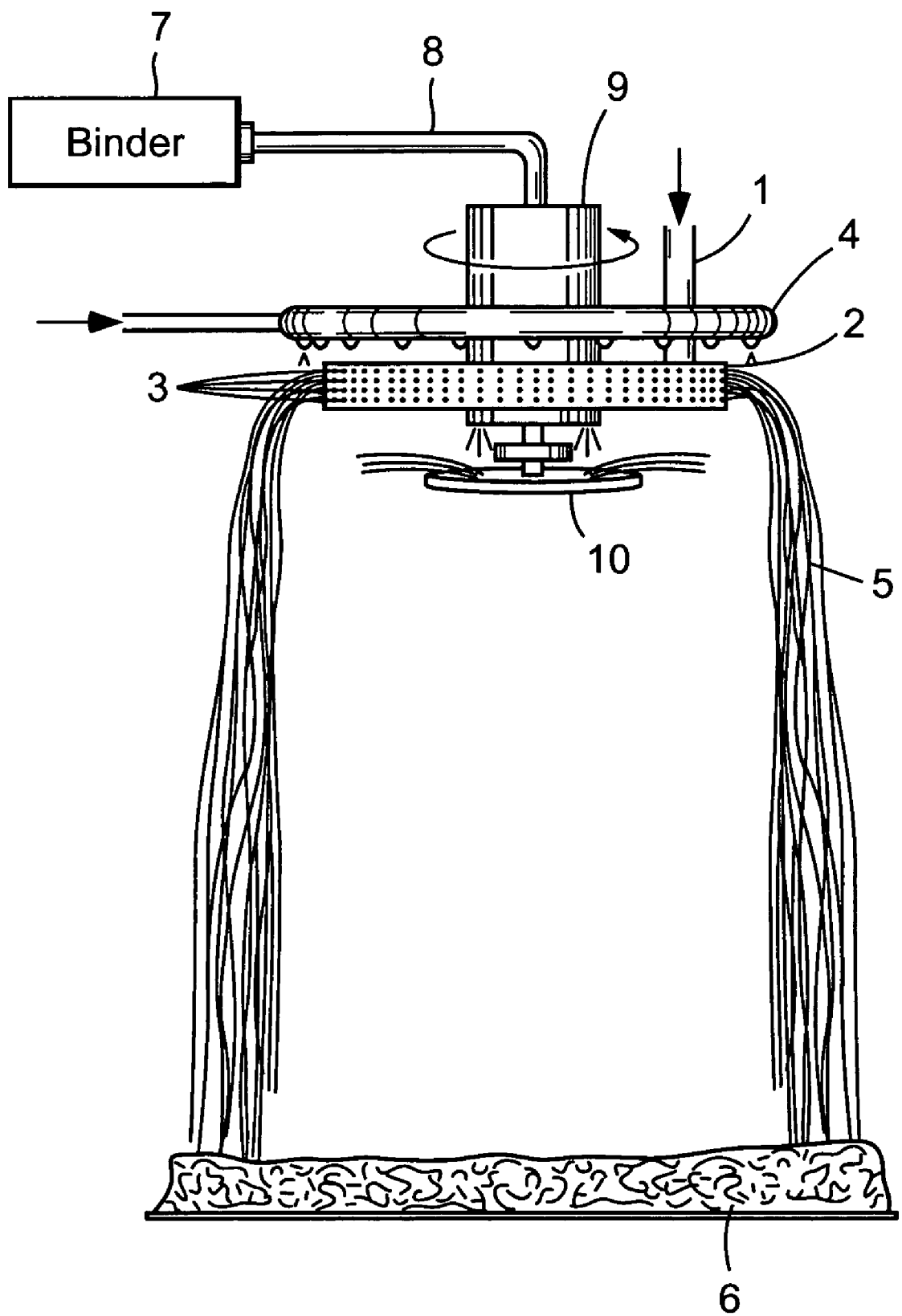
FIG. 1 is a simplified side elevation of the apparatus used in the process of the present invention.

The present invention provides a process for producing a fibrous body employing a binder, which process is more efficient and effective than heretofore has been known to the art. The process comprises the steps of heating material capable of being fiberized to a softening point in order to liquify same. The liquified material is then introduced into a means for extruding the liquid material, such as a spinnerete or spinning rotor. Such means generally has a sidewall containing openings therein whereby the liquid material is extruded through the openings by centrifical force to form primary fibers. The primary fibers are then attenuated to thereby create a moving column of primary fibers. A heat curable liquid binder is then atomized and introduced to the moving column of fibers from a point within the column. It has been found that the atomization of the liquid binder and its application in such a form from inside the column provides for an enhanced binder efficiency which allows all of the binder to be captured and used effectively. Generally, the fibers and binder are then collected in layers, and the layers are heated in order to remove water and cure the binder to thereby form the final product.

The process of the present invention has particular applicability to the preparation of fiberglass products, such as insulation, by the rotary process. The remaining description of the process of the present invention will be made in accordance with this particular and preferred application. The heating of glass to its softening point in order to liquify same and then introducing the molten glass into a spinning rotor having a sidewall containing openings therein in order to extrude the molten glass to form primary fiberglass fibers is well known. Also known is the attenuation of the primary fibers to create a moving column of fibers. The apparatus and processes are described, for example, in U.S. Pat. Nos. 4,058,386 and 5,326,241, which patents are hereby incorporated by reference in their entirety.

The advantages of the present invention are realized by applying a heat curable liquid binder to the moving fibers from a point within the column, and specifically, with the heat curable liquid binder being atomized and then applied as an atomized binder to the moving fibers from a point within the column. For it has been discovered that by atomizing the liquid binder, enhanced binder efficiency is achieved. By atomizing the liquid binder is meant the breaking up of the liquid into small droplets or particles of the solution. It is most preferred that the size of the droplets of solution is in the range of from about 25 to 150 microns, more preferably in the range of from 50 to 150 microns, and most preferably in the range of from 75 to 125 microns. The liquid binder solution can be atomized using any conventional atomizer, such as an air atomized nozzle, a hydraulic nozzle for atomization, or a coil atomizer, such as that available from Coil Manufacturing Ltd., of British Columbia, Canada. It is most preferred for the present invention, however, that a rotary atomizer is used.

One form of rotary atomizer is comprised of a disc that rotates at a high RPM onto which the binder solution is pumped. The solution is atomized once it hits the spinning disc causing the binder solution to form a small colony of formed binder droplets which are propelled outwardly thus impacting the glass fiber column. The rotary atomizer eliminates the need for multiple spray nozzles and avoids plugging or clogging.

Another form of rotary atomizer involves a system where drops of spray are expelled from the center of a rotating hub, into a screen at the perimeter of the atomizer, where the high speed impact pulverizes the drops into a uniform spectrum of droplets, which then impact the glass fiber column. Such a rotary atomization spraying system is commercially available, for example, under the trademark Proptec™, from Ledebuhr Industries, Inc., of Bath, Mich. In general, a rotary atomizer can be driven by an electric motor, a compressed air motor or hydraulic motor. The rotational speed can vary greatly and will ultimately determine or control the size of the atomized droplets. Rotational speeds of from 2500 to 12,000 RPM can generally be employed. The rotation can also be either in the same direction or counter direction to the glass forming spinner rotation.

Application of the binder from the inside of the column of fibers overcomes many of the problems of conventional prior art where the liquid binder solution is sprayed onto the fibers from the outside of the column. When the liquid binder is sprayed from the outside of the column, the binder is often sucked down the column and may actually miss the entire veil of fibers due to this parallel tangentiality. This creates emissions and increases the amount of liquid binder which ends up in the water or air exhaust streams, which is ineffective.

It has been found, however, that the atomizing of the liquid binder and spraying it from the inside of the column of fibers provides additional advantages with regard to binder efficiency. Certainly spraying the binder from the inside of the veil of fibers avoids the problems discussed above, but the atomization of the liquid binder goes to greater enhanced binder efficiency. It has been found that by atomizing, all of the binder is generally captured. More importantly, atomization, and in particular, the use of the rotary atomizer, makes the process independent of binder solution viscosity. This allows one to reduce the water content of the binder solution resulting in less heating energy to dry and cure the subsequent binder fiberglass matrix. In other words, atomization allows one to use more viscous binder liquids. As well, one can use a dirtier solution in the sense that additives or fillers such as clay fillers can be added to the binder solution. The incorporation of fillers and other solid additives in the binder solution would not interfere with the operation of the atomizer, and thus more of the binder, containing filler or additive, can more efficiently be added to the glass fibers.

It is also preferred that the atomizer apply the liquid binder at a position substantially immediately beneath the spinning rotor creating the moving column of fibers. This allows for application of the binder solution at a point closer to the formed glass fiber column, permitting a more effective capture of the binder droplets. Such increased capture efficiency will reduce the amount of binder needed, as much as up to twenty percent or even as much as thirty percent, and preferably at least as much as ten percent. By using the atomizer and hence a more viscous polymer solution as the binder solution, water usage can also be decreased by a substantial amount, e.g., by at least 50%, more preferably by at least 75%, and most preferably by as much as 90%. A reduction in water means that there is less water in the fiberglass/binder matrix to be removed in the ovens. The less water, the less water that is needed to be dried. The ovens are often the bottleneck in the entire process, and thus by rendering the use of the ovens more efficient, one can decrease the size and make the entire process much more efficient.

In another embodiment, there is provided an apparatus for applying a liquid binder to the inside of a veil of primary fibers, such as glass fibers. The apparatus comprises means for heating the material, e.g., glass, to its softening point in order to liquify same, and means for extruding the liquid material, e.g., glass, through openings by centrifical force to form primary fibers. The means for extrusion is generally a spinning rotor or spinnerete. The apparatus also comprises means for atomizing the liquid binder in accordance with the present invention. The atomized liquid binder is then hurled radially outward such that the droplets are captured by the fibers. The atomizing means is generally located beneath the extruding means.

Turning now to the Figures of the Drawing, FIG. 1 is a simplified side elevation of one possible apparatus as used in the process of applying liquid binder to the veil of glass fibers in accordance with the present invention. In the Figure, molten glass is delivered through 1 into a spinning rotor or spinnerete 2 which contains numerous holes 3. The spinning rotor 2 spins a sufficient RPM to cause the molten glass to be extruded through the openings by centrifical force and thereby form primary fiberglass fibers. An air ring 4 mounted above the rotating rotor 2 directs compressed air downwardly so that the fibers 5 exiting the holes 3 in the side wall of the rotor are both attenuating and caused to move in a stream down to the collection point 6. Binder 7 is pumped through 8 through the central housing 9 of the spinning rotor 2 onto the spinning atomizing disc 10. Once the liquid binder hits the spinning disc 10 the liquid binder is atomized into small droplets and flung radially outward to be captured by the glass fibers 5.

The motor used in rotation of rotor 2 and/or the disc 10 can be electric, compressed air driven or hydraulic. In a preferred embodiment, the motor is hydraulic, with the hydraulic fluid being cooled. The cooling of the hydraulic fluid has been found to improve service life.

Figure 2:
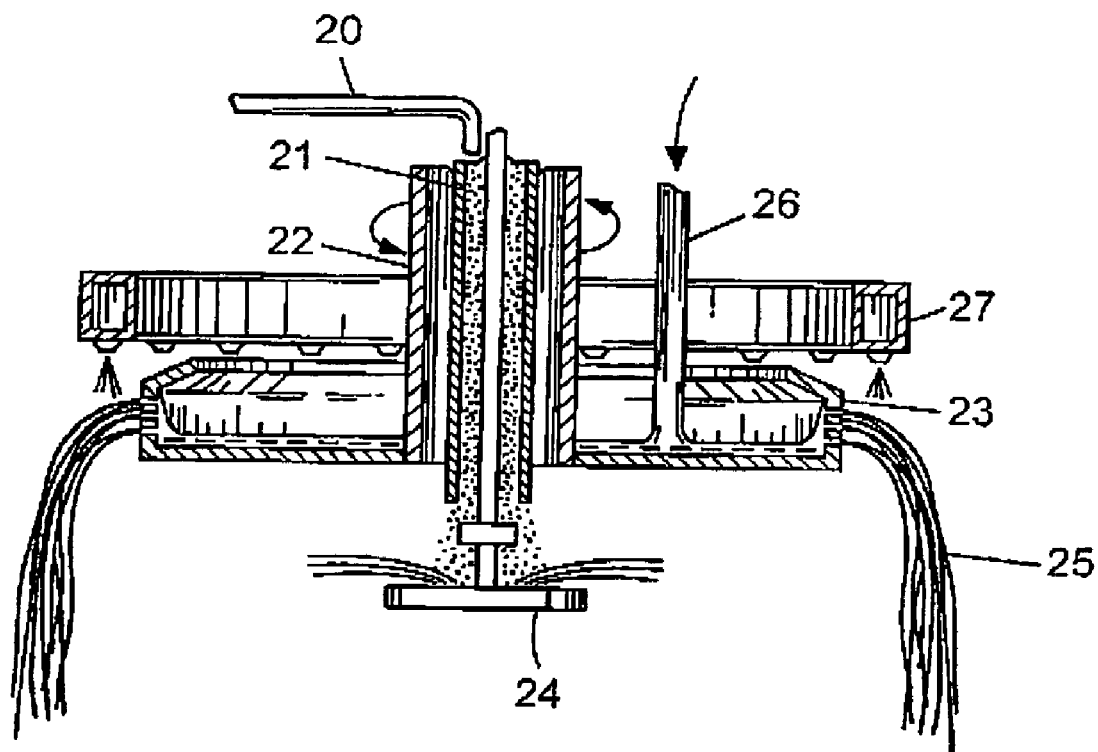
FIG. 2 is a longitudinal sectional view of the apparatus and atomizer used in the process of the present invention.

FIG. 2 is a longitudinal sectional view better showing the inside of the housing as a liquid binder passes therethrough and onto the rotary atomizing disc. Liquid binder is passed through 20, and through the conduit 21 in the central housing 22 of the spinning rotor 23. The liquid binder is then introduced onto the spinning atomizer disc 24, at which time the liquid is atomized into small droplets which are thrown radially outward to be captured by the glass fibers 25. Glass is passed through conduit 26 into the spinning rotor 23, and extruded through openings in the sidewalls of 23 to form the fibers 25. Compressed air is directed downwardly from an air ring 27 mounted above the spinning rotor in order to attenuate and cause the stream of fibers to move downward.

Figure 3:
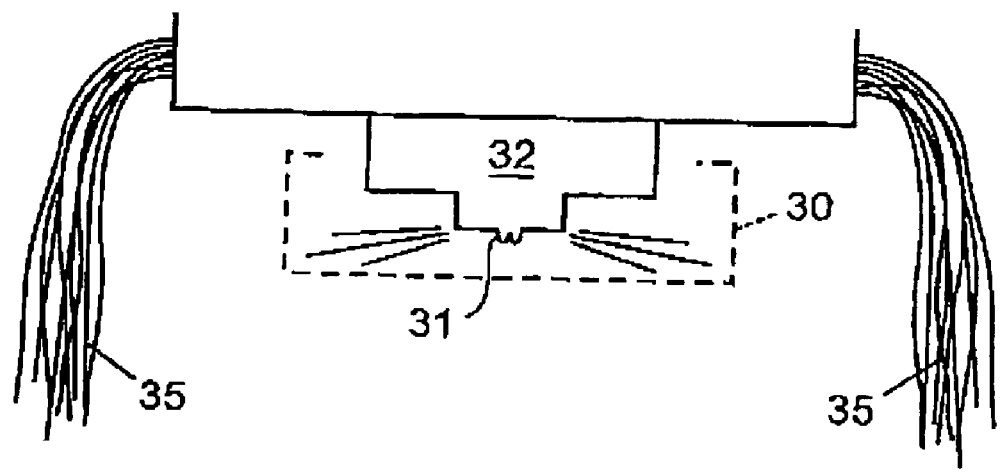
FIG. 3 is a sectional view of a preferred rotary atomizer system for use in the process of the present invention.

FIG. 3 of the drawing depicts a preferred embodiment of rotary atomization, an alternative to the spinning disc shown in FIGS. 1 and 2. The spinning disc system is replaced, in the same central position as shown in FIGS. 1 and 2, with a system which uses a screen 30 for purposes of atomizing the liquid binder. Drops of sprayed liquid binder are expelled from the center 31 of a rotating atomizer 32, with the drops being expelled into the screen 30 at the perimeter of the atomizer. The impact with the screen 30 pulverizes the drops into a spectrum of atomized droplets, which then engage the veil of glass fibers, shown as 5 in FIG. 1 or 25 in FIG. 2, and shown as 35 in FIG. 3.

The application of a liquid binder in accordance with the present invention, as shown in the foregoing Figures of the drawing, occurs from inside the veil of glass fibers. This avoids many of the problems which occur when spray nozzles are used to spray the liquid binder from the outside of the column of fibers. More importantly, the atomization of the liquid binder and its propelling of the atomized droplets from the atomizer directly beneath the spinning rotor radially outward to the veil of glass fibers permits better binder efficiency, i.e., better binder capture. The atomization of the liquid binder also permits more viscous fluids to be used, reducing the amount of water that needs to be used and hence providing for a more overall efficient process since a more efficient cure in the ovens would be realized as one does not need to dry as much water.

EXAMPLE

This example demonstrates the advantages and effectiveness of the process of the present invention. Runs were made spraying the same binder solution on molten glass fibers using a conventional binder ring for spraying from outside the veil (control run) and a rotary atomizer system, such as that shown in FIG. 3, in accordance with the present invention. The specific rotary atomizer used was a Proptec™ atomizer. The binder solution comprised a polyacrylic acid and a polyol.

The ramp moisture and binder efficiency was measured in each instance. The lower the ramp moisture, the better the result as it indicates the ability to hit the target with less water. The binder efficiency was also measured. All runs recorded in the Table below were made at equivalent flow of binder solution.

TABLE

| Run | Flow, g/min | | Binder Efficiency | |
|---|---|---|---|---|
| | Actual | Ramp % | 86.2 | 100% |
| Control A | 6.5 | 5.88 | 86.2 | 100% |
| A1 | 6.5 | 2.34 | 107.6 | 124.7% |
| A2 | 6.5 | 3.17 | 94.8 | 109.9% |
| Control B | 6.5 | 5.89 | 94.4 | 100% |
| B1 | 6.5 | 1.53 | 95.7 | 101.3% |
| B2 | 6.5 | 3.37 | 106.5 | 112.8% |
| B3 | 6.5 | 3.50 | 98.3 | 104.1% |

The foregoing results show that less water is needed in the process of the present invention, which results in reduced dryer load, which thereby helps to debottleneck the oven, a very important advantage. As well, the binder efficiency is improved.

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A process for applying liquid binder to fiberglass, comprising the steps of:
   beating glass to liquify same;
   introducing the liquified glass into a spinning rotor having a sidewall containing openings therein whereby the molten glass is extruded through the openings by centrifugal force to form primary fiberglass fibers;
   attenuating the primary fibers to create a circular column of moving fibers; and
   expelling liquid binder from a rotating rotary member within the column into an atomizing screen that atomizes the liquid binder, wherein atomized binder is introduced to the moving fibers.

2. The process of claim 1, wherein the atomized binder is in the form of droplets in the range of from 25 to 150 μm in size.

3. The process of claim 1, wherein the expelling comprises expelling the liquid binder from the rotary member at a location substantially immediately beneath the spinning rotor.

4. The process of claim 1, wherein the expelling comprises expelling the liquid binder generally radially outwardly from the rotary member.

5. The process of claim 1, wherein the liquid binder is supplied at a flow rate of 6.5 g/min.

6. The process of claim 1, wherein water content of the liquid binder is less than water content of a liquid binder used in a method for producing a fibrous body comprising spraying liquid binder on an outside of the column.

7. The process of claim 1, wherein water content of the liquid binder is at least 50% less than water content of a liquid binder used in a method for producing a fibrous body comprising spraying liquid binder on an outside of the column.

8. A process for producing a fibrous body, comprising the steps of:
   heating material capable of being fiberized to liquify same;
   introducing the liquified material into a spinning rotor having a sidewall containing openings therein whereby the liquified material is extruded through the openings by centrifugal force to form primary fibers;
   attenuating the primary fibers to thereby create a circular column of moving primary fibers;
   expelling liquid binder from a rotating rotary member within the column into an atomizing screen that atomizes the liquid binder, wherein atomized binder is introduced to the moving fibers;
   collecting a layer of the fibers and atomized binder; and
   heating the layer of fibers and atomized binder to cure the atomized binder.

9. The process of claim 8, wherein the liquid binder is atomized by the screen at a location substantially immediately beneath the rotor.

10. The process of claim 8, wherein the expelling comprises expelling the liquid binder radially outwardly from the rotary member at a location below the rotor.

11. The process of claim 8, wherein the atomized binder is in the form of small particles of a size in the range of from 25 to 150 μm.

12. The process of claim 8, wherein the liquid binder is supplied at a flow rate of 6.5 g/min.

13. The process of claim 8, wherein water content of the liquid binder is less than water content of a liquid binder used in a method for producing a fibrous body comprising spraying liquid binder on an outside of the column.

14. The process of claim 8, wherein water content of the liquid binder is at least 50% less than water content of a liquid binder used in a method for producing a fibrous body comprising spraying liquid binder on an outside of the column.

\* \* \* \* \*